United States Patent [19]

Islam et al.

[11] Patent Number: 5,115,488
[45] Date of Patent: May 19, 1992

[54] APPARATUS COMPRISING AN ALL-OPTICAL GATE

[75] Inventors: Mohammed N. Islam, Hazlet; Richard E. Slusher, Lebanon, both of N.J.

[73] Assignee: AT&T Bell Laboratories, Murray Hill, N.J.

[21] Appl. No.: 699,080

[22] Filed: May 10, 1991

Related U.S. Application Data

[63] Continuation-in-part of Ser. No. 679,389, Apr. 2, 1991.

[51] Int. Cl.$^5$ ............................................. G02B 6/10
[52] U.S. Cl. .................................. 385/129; 385/122; 385/131
[58] Field of Search ................ 350/96.12, 96.13, 96.14

[56] References Cited

U.S. PATENT DOCUMENTS 4,919,504  4/1990  Colas et al. ................ 350/96.12
4,932,739  6/1990  Islam ........................... 350/96.15

OTHER PUBLICATIONS

A. Lattes, et al., *IEEE Journal of Quantum Electronics*, vol. QE-19(11), "An Ultrafast All-Optical Gate", Nov. 1983 pp. 1718-1723.

D. Hulin, et al., *Appl. Phys. Lett.* 49(13), "Ultrafast All-Optical Gate with Subpicosecond On and Off Response Time", pp. 749-751, Sep. 1986.

S. R. Friberg, et al., *Optics Letters* Vol. 13(10), "Femotosecond Switching in a Dual-Core-Fiber Nonlinear Coupler", pp. 904-906, Oct. 1988.

J. S. Aitchison et al., *Optics Letters*, vol. 15(9), "Observation of Spatial Optical Solitons in a Nonlinear Glass Waveguide", pp. 471-473; May 1, 1990.

C. Martijn de Sterke et al., *Optics Letters*, vol. 14(16), "Self-Localized Light: Launching of Low-Velocity Solitons in Corrugated Nonlinear Waveguides", pp. 871-873, Aug. 15, 1989.

M. N. Islam, et al. *Optics Letters*, vol. 16(7), "All-Optical time-Domain Chirp Switches", pp. 484-486; Apr. 1, 1991.

K. K. Anderson, et al., *Appl. Phys. Lett.* 56(19), "Femtosecond Dynamics of the Nonlinear Index Near the Band Edge in AlGaAs Waveguides", pp. 1834-1836; May 1990.

J. S. Aitchison et al., *Appl. Phys. Lett.* 56(14), "Role of Two-Photon Absorption in Ultrafast Semiconductor Optical Switching Devices", pp. 1305-1307; Apr. 1990.

V. Mizrahi et al., *Optics Letters* 14(20), "Two-Photon Absorption as a Limitation to All-Optical Switching", pp. 1140-1142, Oct. 1989.

M. Sheik-Bahae et al., *Physical Review Letters* vol. 65(1), "Dispersion and Band-Gap Scaling of the Electronic Kerr Effect in Solids Associated with Two-Photon Absorption", pp. 96-99; Jul. 1990.

K. W. DeLong et al., *Appl. Phys. Lett.* 57(20), "Two-Photon Absorption as a Limitation to All-Optical Waveguide Switching in Semiconductors", pp. 2063-2064; Nov. 1990.

K. Fujii et al., *Physical Review Letters*, vol. 75(14), "Electric-Field-Induced Changes in the Two-Photon Absorption Spectrum of Multiple-Quantum-Well Structures", pp. 1808-1811, Oct. 1990.

*Primary Examiner*—Frank Gonzalez
*Assistant Examiner*—John Ngo
*Attorney, Agent, or Firm*—E. E. Pacher

[57] ABSTRACT

It has been recognized that AlGaAs-containing planar waveguides can be advantageously used in all-optical gates for wavelengths in the range 1.2–1.7 μm. In particular, such waveguides can produce in radiation pulses of center wavelength, $\lambda_s$ a phase shift of magnitude $\pi$ or larger while, at the same time, causing attenuation of the pulse by less than 1/e, provided $hc/\lambda_s < E_g/2$, where $E_g$ is the bandgap associated with the $Al_x Ga_{1-x}As$-contianing waveguide. In preferred embodiments $\lambda_s$ and/or x are selected such that $[hc/(\lambda_s - \Delta\lambda] < E_g/2$, where $\Delta\lambda$ is chosen such that 99% of the pulse energy is contained in the spectral region $\lambda_s \pm \Delta\lambda$.

7 Claims, 4 Drawing Sheets

APPARATUS COMPRISING AN ALL-OPTICAL GATE

CROSS REFERENCE TO RELATED APPLICATION

This application is a continuation-in-part of U.S. patent application Ser. No. 07/679,389, filed Apr. 2, 1991 still pending.

FIELD OF THE INVENTION

This invention pertains to apparatus that comprises all-optical switching means.

BACKGROUND OF THE INVENTION

One of the main advantages cited for optical signal processing is the capability of all-optical devices to switch in times much shorter than those required for electronics. In order to implement such devices, however, optical materials with suitable properties are required. In particular, it is necessary to be able to obtain a significant phase shift without suffering unacceptably high signal loss. As a rule of thumb, an acceptable (nonlinear) optical material is one that can yield, due to the interaction between two optical pulses, a 180° ($\pi$) phase shift in less than the absorption length, i.e., the length over which the signal strength decreases by a factor $e^{-1}$.

Switching means of the type relevant herein will be collectively referred to as "gates". For examples of all-optical gates see A. Lattes et al., *IEEE Journal of Quantum Electronics*, Vol. QE-19(11), p. 1718; D. Hulin et al., *Applied Physics Letters*, Vol. 49(13), p. 749; S. R. Friberg et al., *Optics Letters*, Vol. 13(10), p. 904; J. S. Aitchison, *Optics Letters*, Vol. 15(9), p. 471; E. M. de Sterke et al., *Optics Letters*, Vol. 14(16), p. 871; and M. N. Islam et al., *Optics Letters*, Vol. 16(7), p. 484; all incorporated herein by reference.

Silica-based optical fibers can meet the above rule of thumb criterion, even though their nonlinearity (expressed, for instance, in terms of the third-order susceptibility $\chi^{(3)}$ or the non-linear refractive index $n_2$, which arises from the real part of $\chi^{(3)}$), is very small, exemplarily about $3.2 \cdot 10^{-16}$ cm$^2$/W. However, since the absorption in SiO$_2$-based fiber can be very small indeed (e.g., about 0.2 db/km at 1.55 $\mu$m), it is possible to obtain the required phase shift without suffering unacceptable signal loss by providing a very long interaction length. See, for instance, M. N. Islam, *Optics Letters*, Vol. 16(7), p. 484.

Even though optical fiber can meet the above rule of thumb criterion, in many important potential applications of all-optical gates the use of optical fiber gates is at best inconvenient and may even be impossible, due to the relatively long length of fiber that is required. It thus would be highly desirable to have available a material that can be used to make an all-optical gate that involves a relatively short (of order 1 cm) interaction length L and can meet or surpass the above rule-of-thumb criterion. It would be especially desirable if the material were easily obtainable and had a mature fabrication technology such that components of the requisite small cross-sectional dimensions (frequently at least one of the dimensions is of order 1 $\mu$m) can be easily fabricated, and if the low-loss wavelength region included the wavelengths that are of particular interest for optical communications, namely about 1.3 and 1.55 $\mu$m. It would also be desirable if the material were compatible with photonic integrated device technology. This application discloses such a material.

It has long been known that the non-linearity in semiconductors can be orders of magnitude larger than that of silica-based fiber. The largest non-linearity typically is observed for wavelengths close to but longer than the wavelength that corresponds to the bandgap energy ($E_g$) of the semiconductor. Unfortunately, at these wavelengths the $\pi$-phase shift criterion typically can not be met without significant degradation of time response and loss, due to carrier generation. For instance, K. K. Anderson et al. (*Applied Physics Letters*, Vol. 56(19), p. 1834) report on measurements on AlGaAs ridge waveguides in the range 780–900 nm that found the linear absorption coefficient to be 16 cm$^{-1}$ at 810 nm and 2 cm$^{-1}$ at 830 nm. These wavelengths correspond to detuning of 20 and 40 nm, respectively, from the band edge of the material. These authors state that " . . . it is well known that although there is a resonant enhancement of $n_2$ at wavelengths near the band edge, the increasing linear loss degrades the figure of merit for switching devices. Studies indicate that saturation of the signal intensity due to two-photon absorption limits the usefulness of the non-linearity for optical switching."

J. S. Aitchison et al. (*Applied Physics Letters*, Vol. 56(14), p. 1305) made measurements on GaAs/AlGaAs waveguides at 1.06 $\mu$m and appear to suggest that ZnS might be preferable to GaAs for use in all-optical gates.

V. Mizrahi et al. (*Optics Letters*, Vol. 14(20), p. 1140) derive a criterion [$(2\beta\lambda/n_2)<1$; $\beta$ is the two-photon absorption coefficient, and $<$ is the vacuum wavelength of the radiation] that, according to these authors, should be considered in evaluating a material (e.g., organics) for all-optical switching. They also conclude that strong two-photon absorption (TPA), which may accompany a large $n_2$, can severely hamper all-optical switching in any material.

M. Sheik-Bahae et al. (*Physical Review Letters*, Vol. 65(1), p. 96) show data on several semiconductors (no III/V semiconductors were included; the wavelengths were 0.532 $\mu$m, 1.064 $\mu$m and 10.6 $\mu$m) that indicate that $n_2$ (due to two-photon absorption) has a maximum at or near a wavelength that corresponds to $E_g/2$.

K. W. DeLong et al. (*Applied Physics Letters*, Vol. 57(20), p. 2063) conclude, based on calculations that use the formulae of the above cited Sheik-Bahae paper, that " . . . in order to use the non-band-gap resonant nonlinearity in a semiconductor, the photon energy must be kept out of the regime where TPA is allowed . . . " (i.e. $h\nu < E_g/2$, where h is Planck's constant and $\nu$ is the frequency), and refer to this as a " . . . very restrictive . . . " requirement.

Finally, K. Fujii et al. (*Physical Review Letters*, Vol. 65(14), p. 1808) have measured two-photon absorption spectra of quantum well structures in static electric fields for photon energies close to half the bandgap energy. The samples consisted of an undoped GaAs/Al$_{0.4}$Ga$_{0.6}$As multiple-quantum-well core region embedded in Al$_{0.4}$Ga$_{0.6}$As cladding regions. Measurements were made at wavelengths of, exemplarily, 1.561, 1.685 and 1.711 $\mu$m.

Next will be discussed the background for a particular all-optical gate, namely, the gate disclosed in the parent of this CIP application, which application is in its entirety incorporated herein by reference.

In optical switching and transmission systems, it is important to periodically restore the logic level and timing of pulses traveling in the optical transmission medium. Such restoration is currently performed in regenerators, which typically include electro-optical devices. The current trend toward all optical systems has resulted in development of erbium-doped fiber amplifiers, which when used with soliton pulses, correct the pulse amplitude and shape and thus provide logic level restoration without the need for optical to electrical conversion. When such amplifiers are used, timing restoration is still needed since without such restoration the transmission or switching system can become limited by timing jitter and fluctuations (e.g. from background spontaneous emission, temperature variations, etc.). To date, an optical device for performing such restoration has not been available. However, other advances in soliton transmission and switching systems, such as the ultra-fast optical logic devices, described in U.S. Pat. No. 4,932,739, and the all-optical time domain chirp switch described in a copending application Ser. No. 07/609958 filed on Nov. 6, 1990, and assigned to the same assignee as the present application, are available for use in helping to address the problem described above.

SUMMARY OF THE INVENTION

We have discovered that it is advantageous to use $Al_{1-x}Ga_xAs$ ($0<x<1$)-comprising planar waveguide means in all-optical gates that are intended to operate at a wavelength $\lambda_s$ that is greater than 1.2 μm and less than 1.7 μm, e.g., 1.3 or 1.55 μm. The composition is selected such that $\lambda_s$ is below $E_g/2$ of the material. Such waveguide means can have surprisingly low non-linear loss while exhibiting a relatively large value of $n_2$. As a consequence, gates according to the invention can readily meet and surpass the above discussed π-phase shift criterion. Furthermore, gates according to the invention are based on a well-understood material system with a mature fabrication technology, and thus are readily implemented.

The invention can be embodied in a wide variety of all-optical gates, including the planar waveguide analogs of known fiber-based gates, and the analogs of known planar gates that previously has been implemented in, or proposed for implementation in, a material system other than AlGaAs. Furthermore, it is anticipated that all-optical planar gates of novel geometry that may be discovered in the future will advantageously utilize AlGaAs-comprising waveguide means. Thus, we consider our discovery to be a general one that is not tied to any particular device geometry.

Thus, in a broad aspect the invention is an article that comprises an all-optical gate for operation at a signal wavelength $\lambda_s$ in the range $1.2<\lambda_s<1.7$ μm, the gate comprising planar semiconductor optical waveguide means of novel composition that can impart particularly advantageous properties to the gate. More particularly, the waveguide means are of effective length L and are adapted for guiding the signal radiation. Associated with the waveguide means are a non-linear refractive index $n_2$ and an absorption coefficient α, with $n_2$ and α being such that, in the presence of an appropriate control pulse, a pulse of signal radiation of center wavelength $\lambda_s$ can, while propagating through the waveguide means, undergo a phase shift of magnitude π while, at the same time, suffer attenuation by less than $e^{-1}$ (where e is the base of the natural logarithm). Significantly, the planar semiconductor optical waveguide means comprise $Al_{1-x}Ga_xAs$, with $0<x<1$, and x selected such that $(hc/\lambda_s)<E_g/2$, where h is Planck's constant, and c is the speed of light in vacuum. In preferred embodiments x and/or $\lambda_s$ are selected such that $[hc/(\lambda_s-\Delta\lambda)]<E_g/2$, where $\Delta\lambda$ is selected such that 99% of the energy of the signal pulse is present in the spectral region $\lambda_s \pm \Delta\lambda$. It will be understood that waveguide means according to the invention optionally can comprise one or more quantum wells, wherein the effective value of $E_g$ is a function of well width and depth, as well as of the exciton binding energy, as is known to those skilled in the art.

In an exemplary embodiment of the present invention, timing restoration for a sequence or series of input pulses is performed optically in a transmission or switching system. The restoration means comprise a waveguide according to the invention that uses AlGaAs as a nonlinear material with negligible walk-off that also receives an essentially orthogonally polarized sequence or series of reference pulses. In the nonlinear waveguide, the input pulses are frequency shifted by the presence of the reference pulses. For a material with negligible walk-off, the frequency shift only occurs when the pulses partially overlap, but not when the pulses are coincident. The frequency shifted output from the nonlinear waveguide is supplied to a dispersive delay line that translates the frequency shift into a time shift, such that the input pulses are retimed by the reference pulses. Since the nonlinear material has, in the wavelength regime of interest, a nonlinear index of refraction $n_2>0$, the dispersive delay line must have an anomalous Group Velocity Dispersion (GVD).

In one embodiment, the invention can be realized by a hybrid time domain chirp switch (TDCS) similar to the one described in the above-cited patent application, that consists of a nonlinear chirper (which is implemented in a AlGaAs waveguide) followed by a dispersive delay line (which may be implemented in a polarization maintaining fiber). The chirp switch described in the above-cited patent application is modified, however, by arranging the nonlinear chirper (semiconductor waveguide) so that it exhibits negligible walk-off.

Using a timing restorer in accordance with the exemplary embodiment, an all-optical regenerator for solitons can be achieved by cascading a hybrid TDCS according to the invention with an optical amplifier such as an erbium-doped fiber amplifier. The regenerator advantageously will thus provide restoration of the amplitude, pulse shape, and timing.

DETAILED DESCRIPTION

Figure 1:
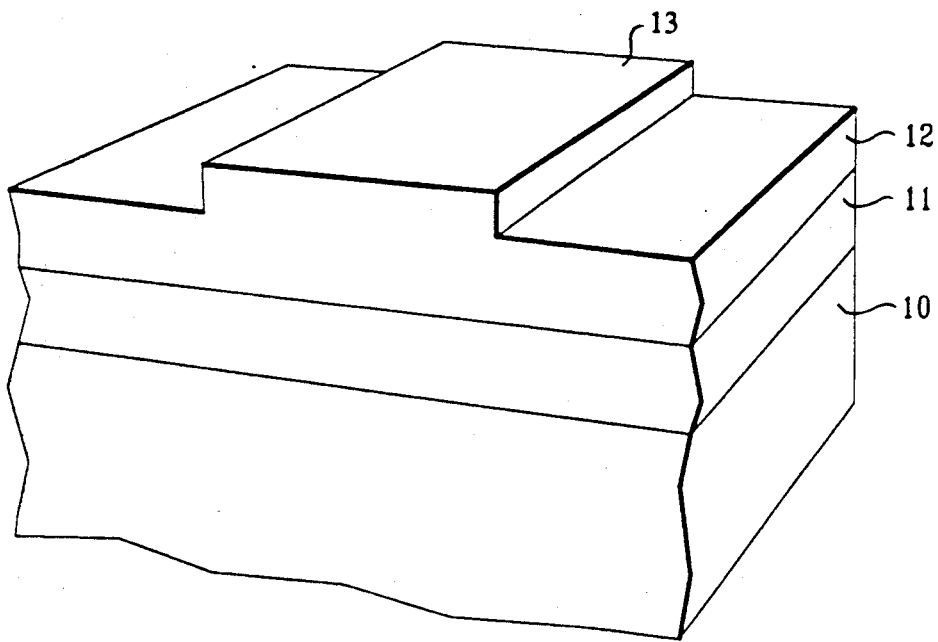
FIG. 1 schematically depicts an exemplary waveguide according to the invention.

The fact that an AlGaAs-containing waveguide can have the desired relatively large phase shift and relatively small attenuation was established, inter alia, by means of measurements on ridge waveguide structures of the type schematically shown in FIG. 1. On GaAs substrate 10 was grown a 2.55 μm $Al_{0.5}Ga_{0.5}As$ cladding layer 11, followed by growth of a 2.55 μm $Al_{0.2}Ga_{0.8}As$ "core" layer 12. In the core layer was formed a 0.7 μm high and 4.5 μm wide ridge 13. All this was done by conventional means. Exemplarily, the length of the waveguide was 7.7 mm. Typically, waveguide means according to the invention will have an effective length L of order 1 cm. Frequently $L \leq 1$ cm.

The layer compositions were chosen such that, for the desired pulse center frequency $\lambda_c$ and the desired pulse length, all significant Fourier components of the pulse had wavelengths above the maximum wavelength for TPA. By "all significant Fourier components" we mean herein all Fourier components lying within the wavelength regime $\lambda_c \pm \Delta\lambda$, where $\Delta\lambda$ is chosen such that 99% of the total energy of the pulse is contained within the limits. As those skilled in the art will recognize, $E_g$ of $Al_{0.2}Ga_{0.8}As$ is such that 1.6 μm radiation lies about 100 meV below the half-gap energy.

The refractive index of the cladding layer was about 0.15 lower than that of the core layer. This, together with the above disclosed dimensions of the ridge resulted in a waveguide that supported only the lowest few modes. Careful excitation resulted in domination in the transmitted light of the lowest order mode.

Pulses (0.36 psec FWHM, separated by 11.9 nsec) from a passively mode-locked NaCl color center laser were coupled into the waveguide by conventional means. The laser was tunable over the range 1.5–1.7 μm. A signal pulse was formed by frequency shifting a portion of the laser output by 80 MHz using an acousto-optic modulator. The polarization orientation, time delay and amplitude of the signal pulses were varied to measure the nonlinear optical properties of the waveguide. The frequency spectra of the pulses after transmission through the guide were measured with a grating spectrometer, and the pulse shapes were measured with an optical correlator.

Figure 2:
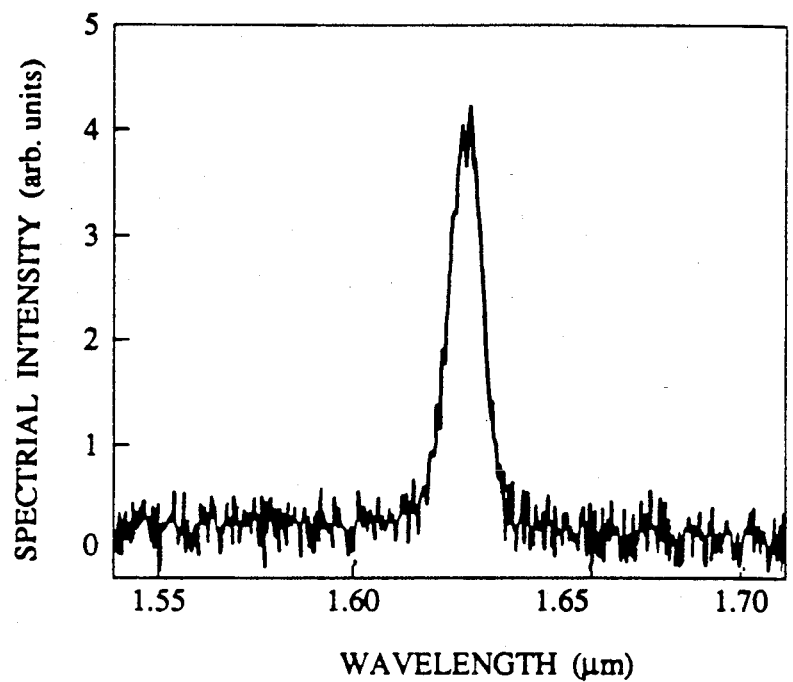
FIGS. 2-5 show exemplary experimental results pertaining to phase shifting in a waveguide according to the invention.
Figure 3:
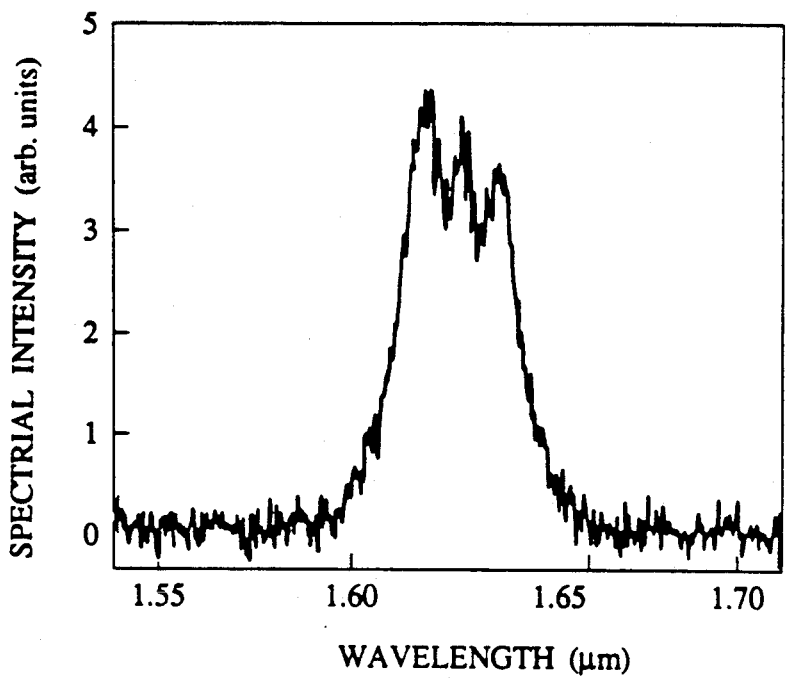
Figure 4:
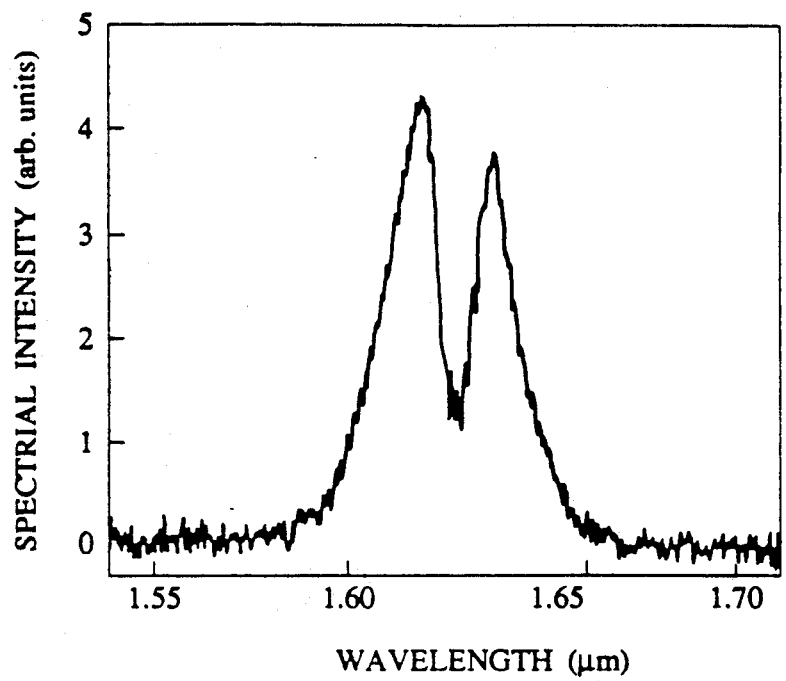
Figure 5:
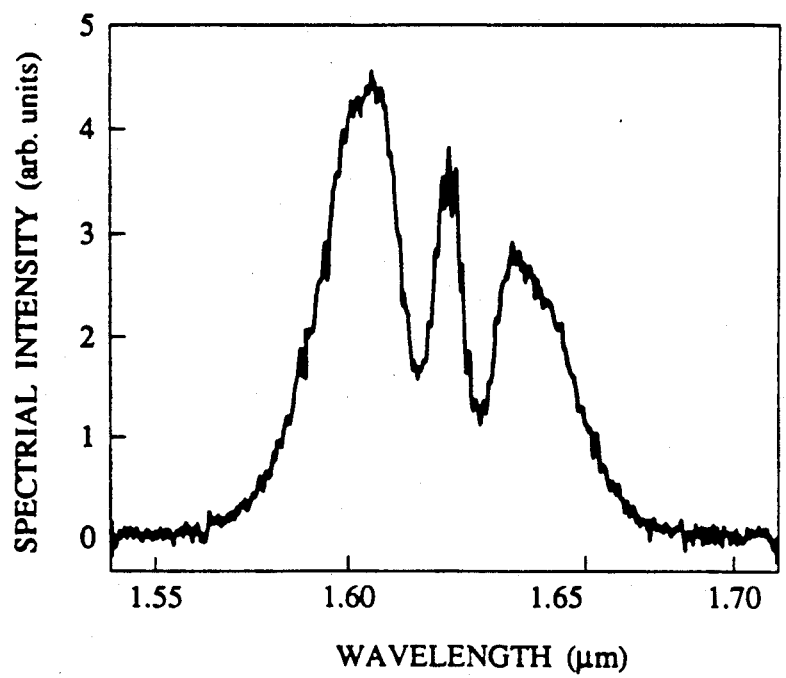

FIGS. 2–5 show exemplary results obtained as described above, with FIG. 2 showing the input spectrum, and FIGS. 3–5 showing output pulses phase shifted by about $\pi$, 1.5$\pi$ and 2.5$\pi$, respectively. Similar spectra were obtained at other wavelengths within the wavelength region of interest. Furthermore, similar spectra were measured for signal pulses polarized orthogonally with respect to the control pulses.

The signal intensity was typically maintained at one tenth of the control intensity. Exemplarily the intensity required for a $\pi$ phase shift is 3.7±0.5 GW/cm². Our measurements establish that, at the stated wavelengths, $n_2 \sim 3 \times 10^{-14}$ cm²/W in AlGaAs, which is about two orders of magnitude larger than in fused silica.

Figure 6:
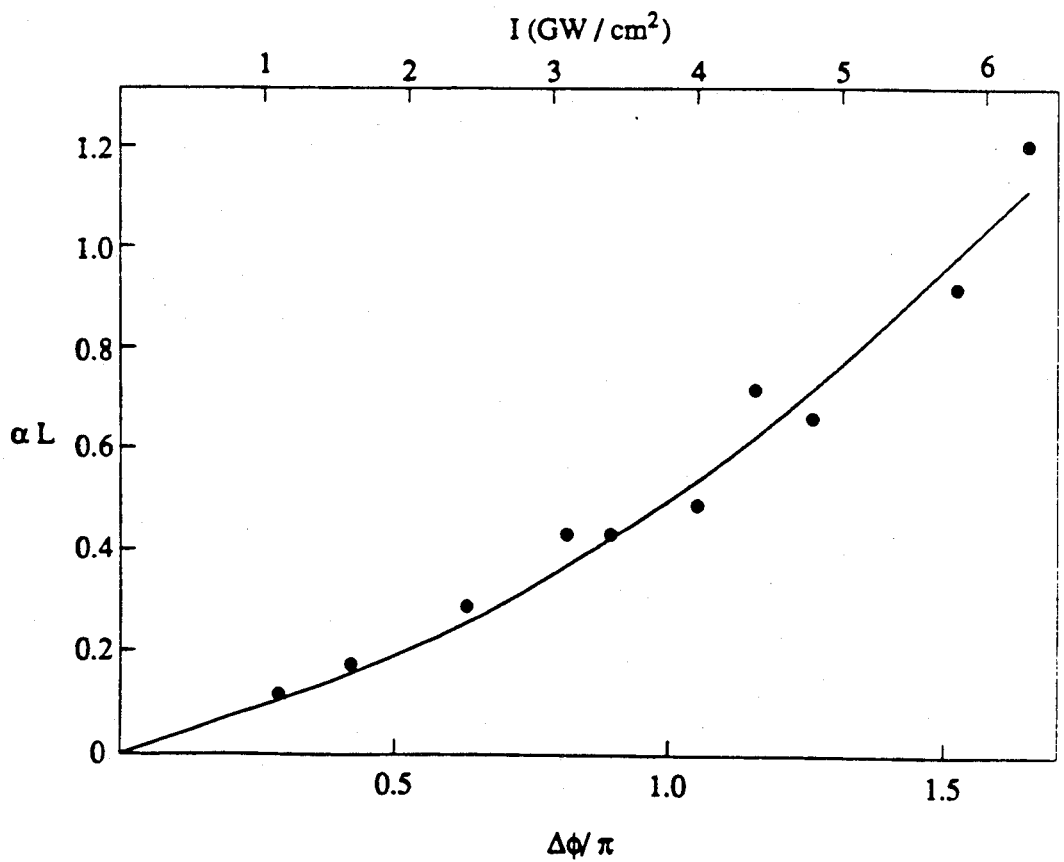
FIG. 6 gives exemplary data on loss vs. control intensity.

Even at a 2$\pi$ phase shift the measured non-linear loss for the control pulses was only about 15%. Exemplary data on the energy loss for the radiation propagating through the guide is shown in FIG. 6, where $\alpha$ is the absorption coefficient, L is the length of the waveguide, $\Delta\phi$ is the phase shift, and I is the control pulse intensity. There was no significant linear loss in these measurements, such that the observed loss was due primarily to multiphoton absorption. Although in the above-described relatively large waveguide a $\pi$ phase shift required a control pulse energy of nearly 80 pJ, we believe that appropriate reduction of the waveguide cross section will make it possible to achieve a $\pi$ phase shift with pulse energies of about 10 pJ. For some interesting switching applications phase shifts of only about 0.1$\pi$ are sufficient.

Next we will describe in detail a particular embodiment of the invention.

Figure 7:
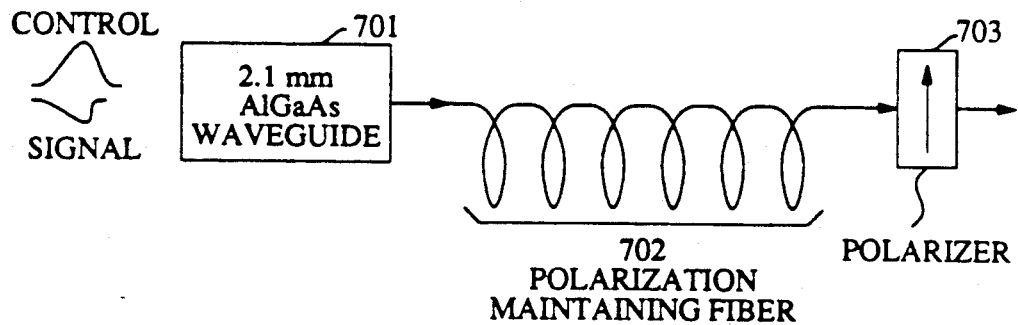
FIG. 7 schematically depicts an exemplary embodiment of the invention.

In accordance with the present invention, the time domain chirp switch (TDCS) of the above-cited co-pending patent application is modified to yield a "hybrid" TDCS by using a nonlinear AlGaAs chirper having negligible walk-off. By this, we mean that the orthogonally polarized control and signal pulses have the same velocity, and, therefore, maintain their relative positions while propagating through the nonlinear material. In the nonlinear chirper, the control or input pulse is frequency shifted (or "chirped") by the presence of the reference or signal pulse. For a material with negligible walk-off, the frequency shift only occurs when the pulses partially overlap, but not when the pulses are coincident. As shown in FIG. 7, the output of AlGaAs waveguide chirper 701 is coupled into polarization maintaining fiber 702 that exhibits anomalous group velocity dispersion (GVD) since $n_2 > 0$. The GVD in 702 translates the frequency shift provided by chirper 701 into a time shift, such that the desired timing restoration or correction is obtained.

The hybrid TDCS shown in FIG. 7 was tested in experimental apparatus that included a passively mode-locked color center laser that supplies ~415 fsec pulses near 1.69 μm. Delay line 702 was implemented as 600 m of polarization maintaining, dispersion-shifted fiber with a zero dispersion wavelength of 1.585 μm (group velocity dispersion at 1.69 μm is about 6 ps/(nm·km)). Waveguide 701 was 2.1 mm long and had a cross-sectional area of approximately 2.5 μm × 5 μm. It was formed as a ridge waveguide in a 2.55 μm thick layer of $Al_{0.2}Ga_{0.8}As$; guiding was assured by a 2.55 μm buffer layer of $Al_{0.5}Ga_{0.5}As$ that had a refractive index 0.15 less than the active layer. A large waveguide was chosen for ease of coupling using bulk optics, and, although several spatial modes were supported, the fiber afterwards acted as a spatial filter to favor the lowest order mode. The semiconductor material composition was chosen so that the laser spectrum lies more than 100 meV below the half-gap energy, thus avoiding two photon absorption. In this wavelength range it was found that $n_2 \sim 3 \times 10^{-14}$ cm²/W and that the material is isotropic (e.g. cross-phase modulation is two-thirds of self-phase modulation). In this experiment a $\pi$-phase shift from self-phase modulation with less than a ten percent absorption was obtained, and it was found that the nonlinear absorption originated primarily from three photon absorption. Furthermore, time resolved pump-probe measurements confirmed that the nonlinearity was instantaneous on the 500 fs time scale of the pulses.

Figure 8:
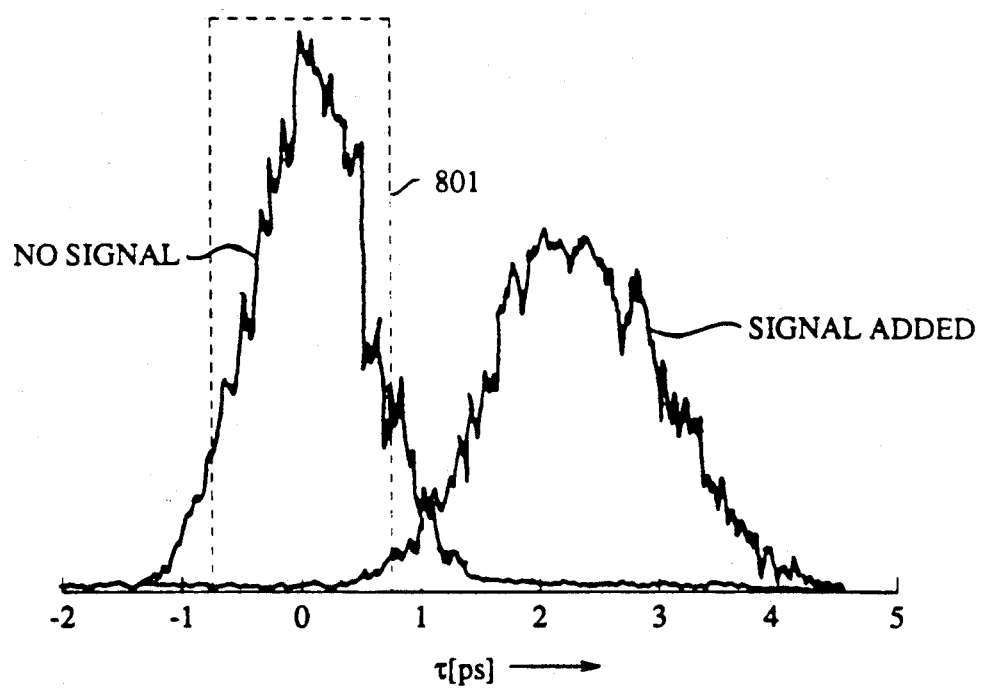
FIG. 8 shows exemplary data obtained with a system of the type shown in FIG. 7.

The time shift keyed data for the hybrid TDCS of FIG. 7 is illustrated in FIG. 8, where the signal energy in the waveguide is 9.8 pJ and the control energy is 96.5 pJ. Rectangle 801 outlines the clock window, and it is noted that adding the signal shifts the control pulse out of this window. Because of mode mismatch and poor coupling into the fiber, the control energy exiting the fiber is 30.2 pJ, yielding a device fan-out or gain of about 3. Nonlinear phase shifts based on earlier nonlinear spectroscopy in longer lengths of the same waveguide were estimated. The peak self-phase-modulation phase shift for the control pulse in the waveguide was found to be about $\pi/3$, while the peak cross-phasemodulation phase shift imposed on the control by the signal was about $\pi/40$.

We have established that the hybrid TDCS can provide the timing restoration that is desired. For example, suppose that the control pulse is the input pulse and that the signal pulse is a "reference" pulse with the proper temporal position. We define the separation between the pulses $\delta t = t_{input} - t_{ref}$ and the shift of the input pulse $\Delta T$. Therefore, if the input pulse is earlier than the reference pulse ($\delta t < 0$), then the nonlinear interaction pulls the input pulse to later times ($\Delta T > 0$), and vice versa. To precisely correct for timing errors, the reference pulse level can be adjusted so the slope of the time curve near $\delta t \sim 0$ is unity. Further detail can be found in the parent application of this continuation-in-part application.

Figure 9:
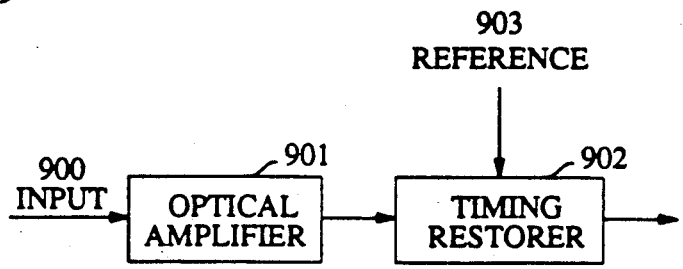
FIG. 9 schematically depicts a relevant portion of an optical fiber communication system according to the invention.

The use of a timing restorer in accordance with the present invention in an all optical pulse regenerator, is illustrated in FIG. 9. As shown, a stream or series of soliton pulses on input 900 are applied to an optical amplifier 901, which may be a erbium-doped fiber amplifier, in order to restore the amplitude and shape of the pulses. Thereafter, the pulses are applied to a timing restorer 902, which receives a stream or series of reference pulses on input 903. Restorer 902 implemented as shown in FIG. 7 restores the input pulses on line 900 to the timing provided by the reference pulses. The regenerator of FIG. 9 is all optical, and does not require any electro-optical components.

Those skilled in the art will recognize that the invention can be embodied in a wide variety of waveguide means, including waveguide means that comprise a superlattice structure. The latter can be a very effective non-linear element, with or without means for applying an electric field to tune the two-photon absorption edge, and their use in apparatus according to the invention is contemplated.

We claim:

1. An article comprising an all-optical gate comprising optical waveguide means of effective length L, the waveguide means adapted for guiding electromagnetic signal radiation of wavelength $\lambda_s$, associated with said waveguide means being a bandgap energy $E_g$, a non-linear refractive index $n_2$ and an absorption coefficient $\alpha$, with $n_2$ and $\alpha$ being such that, in the presence of a control pulse of electromagnetic radiation, a pulse of signal radiation of centerwavelength $\lambda_s$ can, while propagating through said waveguide means, undergo a phase shift of magnitude at least equal to $\pi$ while, at the same time, undergo attenuation by less than $e^{-1}$; characterized in that a) $1.2\ \mu m < \lambda_s < 1.7\ \mu m$; and b) the optical waveguide means are planar semiconductor waveguide means comprising $Al_{1-x}Ga_xAs$, with $0 < x < 1$, with x selected such that $(hc/\lambda_s) < E_g/2$, where h is Planck's constant, and c is the speed of light in vacuum.

2. An article according to claim 1, wherein 99% of the signal pulse energy is contained in the spectral region $\lambda_s \pm \Delta\lambda$, and wherein x is selected such that $[hc/(\lambda_s - \Delta\lambda)] < E_g/2$.

3. An article according to claim 1, wherein the waveguide means comprise at least one quantum well.

4. An article according to claim 1, wherein $L \leq 1$ cm.

5. An article according to claim 1, wherein $\lambda_s$ is substantially equal to either 1.55 $\mu$m or 1.3 $\mu$m.

6. An article according to claim 5, wherein the article is an optical switching system or an optical transmission system.

7. An article according to claim 3, further comprising means for applying an electric field to the waveguide means.

* * * * *